United States Patent
Loborg et al.

(10) Patent No.: US 10,003,980 B2
(45) Date of Patent: Jun. 19, 2018

(54) NEIGHBOUR RELATIONS MANAGEMENT

(75) Inventors: Peter Loborg, Linköping (SE); Fredrik Gunnarsson, Linköping (SE)

(73) Assignee: Telefonaktiebolaget LM Ericsson (Publ), Stockholm (SE)

(*) Notice: Subject to any disclaimer, the term of this patent is extended or adjusted under 35 U.S.C. 154(b) by 328 days.

(21) Appl. No.: 14/233,037

(22) PCT Filed: Jul. 15, 2011

(86) PCT No.: PCT/EP2011/062115
§ 371 (c)(1),
(2), (4) Date: Jan. 15, 2014

(87) PCT Pub. No.: WO2013/010566
PCT Pub. Date: Jan. 24, 2013

(65) Prior Publication Data
US 2014/0162660 A1    Jun. 12, 2014

(51) Int. Cl.
H04Q 7/10    (2006.01)
H04W 24/02    (2009.01)
H04W 36/00    (2009.01)

(52) U.S. Cl.
CPC ....... H04W 24/02 (2013.01); H04W 36/0061 (2013.01)

(58) Field of Classification Search
CPC . H04W 36/0083; H04W 36/00; H04W 48/10; H04W 48/12; H04W 36/06; H04W 36/08; H04W 36/10
(Continued)

(56) References Cited

U.S. PATENT DOCUMENTS 7,493,120 B2 * 2/2009 Kim .................. H04W 36/0083
455/424
7,603,124 B2 * 10/2009 Claussen ............... H04W 16/18
455/436

(Continued)

FOREIGN PATENT DOCUMENTS

RU    2419253 C2    5/2011
WO    2008086460 A2    7/2008
(Continued)

OTHER PUBLICATIONS

"3rd Generation Partnership Project; Technical Specification Group Radio Access Network; Evolved Apr. 5, 2011 Universal Terresirial Radio Access (EW TRA) and Evolved Universal Terrestrial Radio Access Network (E-UTRAN); Overall description; Stage 2 (Release 10)"; 3GPP Standard; 3GPP TS 36.300, 3rd Generation Partnership Project (3GPP), Mobile Competence Centre; 650, Route Des Lucioles; P-06921 Sophia-Antipolis Cedex; France (retrieved on Apr. 5, 2011).

(Continued)

*Primary Examiner* — Kathy Wang-Hurst
*Assistant Examiner* — Julio Perez
(74) *Attorney, Agent, or Firm* — Patent Portfolio Builders, PLLC

(57) ABSTRACT

A radio base station and a method therein for management of neighbor relations with respect to neighboring radio base stations are provided. The radio base station is connected to an Operation and Maintenance, O&M system requesting performance measurement data relating to the neighbor relations from the radio base station. The radio base station 200, 300, 400 is configured to associate each neighbor relation with a predefined first or a predefined second neighbor relation type, wherein the first neighbor relation type indicates that the neighbor relation is to be monitored and the second neighbor relation type indicates that the (Continued)

neighbor relation is to be unmonitored. The base station is further configured to collect performance measurement data relating to mobility for neighbor relations associated with the first neighbor relation type, and to send the collected performance measurement data only for neighbor relations associated with the first neighbor relation type to the O&M system.

14 Claims, 8 Drawing Sheets

(58) Field of Classification Search
USPC ........ 455/424, 22.1, 438, 436; 370/245, 331
See application file for complete search history.

(56) References Cited

U.S. PATENT DOCUMENTS

| | | | | |
|---|---|---|---|---|
| 8,958,801 | B2* | 2/2015 | Ryu | H04W 36/0083 455/436 |
| 2004/0235478 | A1* | 11/2004 | Lindquist | H04W 36/0083 455/440 |
| 2008/0130578 | A1* | 6/2008 | Wang | H04W 48/10 370/331 |
| 2008/0280604 | A1* | 11/2008 | Ore | H04W 48/10 455/424 |
| 2009/0264130 | A1* | 10/2009 | Catovic | H04W 36/0083 455/436 |
| 2010/0124173 | A1* | 5/2010 | Agashe | H04W 36/0083 370/245 |
| 2011/0021201 | A1* | 1/2011 | Lee | H04W 48/20 455/444 |
| 2013/0310044 | A1* | 11/2013 | Rakos | H04W 36/0083 455/436 |

FOREIGN PATENT DOCUMENTS

| | | |
|---|---|---|
| WO | WO 2010/056172 | 5/2010 |
| WO | WO 2010/056172 A1 | 5/2010 |
| WO | WO 2011/046159 A1 | 4/2011 |
| WO | WO 2011/082826 | 7/2011 |
| WO | WO 2011/082826 A1 | 7/2011 |

OTHER PUBLICATIONS

International Search Report for International Application No. PCT/EP2031/062115, dated Feb. 9, 2012.
State Intellectual Property Office of People's Republic of China, First Office Action (for PCT Application Entering the National Phase), Application No. 201180072337.8, 2 pages, dated Dec. 5, 2016.
RU Decision on Grant of Patent for Invention for Application No. 2014/105531/07 Application filed Jul. 15, 2011 (English translation attached), May 15, 2015.
EP office action in application No. 11733681.8 dated Oct. 17, 2014.

* cited by examiner

NEIGHBOUR RELATIONS MANAGEMENT

This nonprovisional application is a U.S. National Stage Filing under 35 U.S.C. § 371 of International Patent Application Serial No. PCT/EP2011/062115, filed Jul. 15, 2011 and entitled "Neighbour Relations Management."

TECHNICAL FIELD

Embodiments herein relate generally to managing of neighbour relations in a wireless communication network, and in particular to managing of neighbour relations to reduce amount of data being reported to an Operation and Maintenance system.

BACKGROUND

In wireless communication networks, different cells in the network experience various loads, interference, variations in load and variations in the number of user equipments being located within the different cells. These variations result in performance variations in different cells and possibly temporary overloads of the capacity or resources in certain cells during for example peak hours. In order to supervise the wireless communication network, different performance measurements are performed on for example cell level.

In order to supervise a communication network, traditionally the different nodes in the wireless communication network record events by using counters, and the counter values are reported or sent regularly to the Operation and Maintenance, O&M, system. These different counters are also referred to as performance measurement data. Some of these counters are per cell or neighbour relation. A neighbour relation is between two neighbouring cells in the wireless communication network. Typically, each cell has several neighbour relations to other neighbouring cells. A wireless communication network may comprise a very large amount cells, each cell having a plurality of neighbour relations, resulting in a vast amount of neighbour relations.

With many neighbour relations, the total amount of measured performance data can thus be extensive. With the so called Automatic Neighbour Relations feature in wireless networks, mobile terminals can uniquely identify neighbours meaning that the neighbour relations are automatically introduced upon discovery. Hence, there is a risk that handling performance measurement data is a challenge, both in terms of signalling to the O&M system as well as in database storage in the O&M system.

In order to enable O&M data transport and storage dimensioning, one approach would be to limit the number of allowed neighbour relations per cell. This in turn means that the logical network model of network element relations is incomplete.

SUMMARY

It is an object of the exemplifying embodiments to address at least some of the problems outlined above. In particular, it is an object of the exemplifying embodiments to provide a radio base station and a method therein for management of neighbour relations with respect to neighbouring radio base stations, wherein each neighbour relation is associated with a predefined first or a predefined second neighbour relation type and wherein collected performance measurement data only for neighbour relations associated with the first neighbour relation type are sent to the O&M system. These objects and others may be obtained by providing a radio base station and a method in a radio base station according to the independent claims attached below.

According to an aspect a method in a radio base station for management of neighbour relations with respect to neighbouring radio base stations is provided. The radio base station is connected to an Operation and Maintenance, O&M, system requesting performance measurement data relating the neighbour relations from the radio base station. The method comprises associating, in the radio base station, each neighbour relation with a predefined first or a predefined second neighbour relation type, wherein the first neighbour relation type indicates that the neighbour relation is to be monitored and the second neighbour relation type indicates that the neighbour relation is to be unmonitored. The method further comprises collecting performance measurement data relating to mobility for neighbour relations associated with the first neighbour relation type, and sending the collected performance measurement data only for neighbour relations associated with the first neighbour relation type to the O&M system.

According to an aspect, a radio base station adapted to manage neighbour relations with respect to neighbouring radio base stations is provided. The radio base station is connected to an Operation and Maintenance, O&M system requesting performance measurement data relating to the neighbour relations from the radio base station. The radio base station comprises a processing unit configured to associate each neighbour relation with a predefined first or a predefined second neighbour relation type, wherein the first neighbour relation type indicates that the neighbour relation is to be monitored and the second neighbour relation type indicates that the neighbour relation is to be unmonitored. The radio base station further comprises a collecting unit configured to collect performance measurement data relating to mobility for neighbour relations associated with the first neighbour relation type. The radio base station comprises a transmitting unit configured to send the collected performance measurement data only for neighbour relations associated with the first neighbour relation type to the O&M system.

The radio base station and the method therein have several advantages. The amount of data sent from each radio base station in the wireless communication network is reduced, which reduces the storage requirements in the O&M system. It further reduces analysing resources in the O&M system as a reduced amount of data needs to be analysed. Still further, it reduces the load on the interface between the radio base station and the O&M system. This results in more efficient transfer of O&M data, i.e. the collected performance measurement data. Still an advantage is that the logical network model is more accurate since the number of neighbour relation limits per cell of radio base stations may not need to be considered due to transport and storage limits.

BRIEF DESCRIPTION OF DRAWINGS

Embodiments will now be described in more detail in relation to the accompanying drawings, in which.

DETAILED DESCRIPTION

Briefly described, exemplifying embodiments of a radio base station and a method therein are provided for management of neighbour relations with respect to neighbouring radio base stations. A neighbour relation between two base stations is associated with a relation type in order to differentiate between different types or kinds of neighbour relations. This differentiation of neighbour relations enables the radio base station to report performance measurements pertaining to certain neighbour relations and refraining from reporting performance measurements pertaining to other neighbour relations.

Figure 2A:
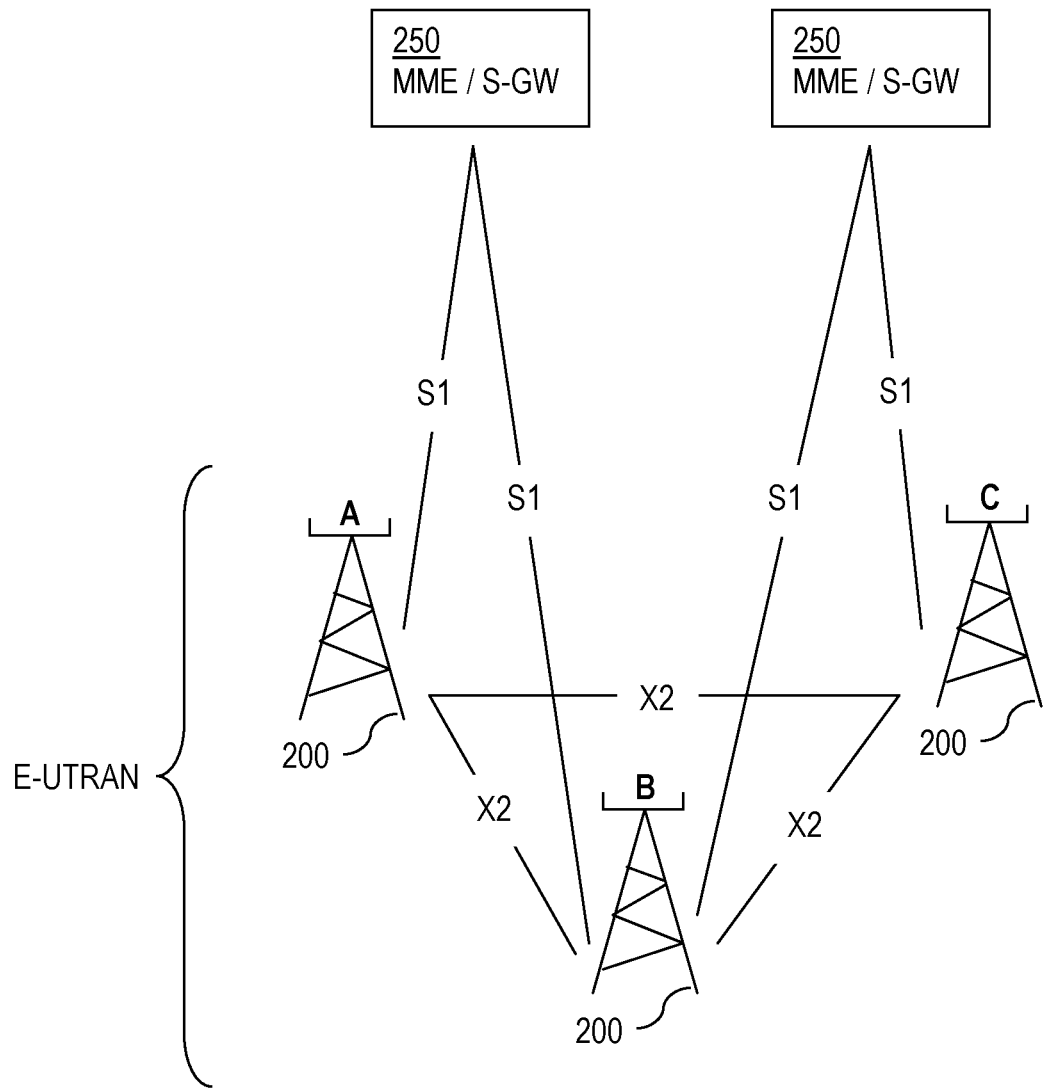
FIG. 2a is a schematic illustration of a part of a Long Term Evolution, LTE, system comprising MMEs and radio base stations.

Firstly, FIG. 2a is a schematic illustration of a part of a Long Term Evolution, LTE, system comprising MMEs and radio base stations. FIG. 2a illustrates three radio base stations 200 and two Mobile Management Entities, MMEs. 250. The radio base stations 200 are part of the radio access system, which employs a wireless air interface, which in LTE is called Enhanced Universal Terrestrial Radio Access, E-UTRAN. In LTE, the radio base stations 200 may communicate or perform handovers of user equipments (not shown) among themselves without interference of the MME 250. This is done by using an interface or protocol called X2. The radio base stations 200 communicate with the MMEs 250 using an interface or protocol called S1. FIG. 2a illustrates just three radio base stations 200, but a wireless communication system typically comprises a large amount of cells and radio base stations as having been discussed above. It can be realised from FIG. 2a that each radio base station 200 or A, B, C has several neighbour relations; at least two are shown in FIG. 2a.

As an example, assume that there is a road or railway passing through the two cells being served by radio base stations A and B respectively causing user equipments being frequently handed over between the two radio base stations A and B. Assume further that there is another road passing through the two cells being served by radio base stations B and C respectively causing user equipments being frequently handed over between the two radio base stations B and C. Finally assume that there is just a small walking path between the two cells being served by radio base stations A and C respectively such that user equipments are rarely handed over between radio base stations A and C. This means that the neighbour relation between radio base stations A and B is frequently used as well as the neighbour relation between radio base stations B and C. However, the neighbour relation between radio base stations A and C is rarely used. In this scenario, traditionally all neighbour relations are sent or reported to the O&M system. For the neighbour relation between radio base stations A and C, the counters may be close to zero or empty but they are still sent to the O&M system.

In a relatively large communication system, there may be a substantial amount of neighbour relations that are rarely used, which means that the counters can be close to empty but are still sent up to the O&M system.

The radio base station broadcasts an identifying signature or waveform, which can be seen as a "fingerprint", that the user equipments use both as time and frequency reference, as well as to identify cells. Each waveform is enumerated by the Physical Cell Identity (PCI). These identifying signatures are not unique (there are 504 different PCIs in LTE), and can therefore not be used to uniquely identify a neighbour cell. In addition, each cell broadcasts as part of the system information a globally unique cell identifier (CGI).

The radio base station maintains a neighbour relation table (NRT) for each cell. Roughly, each entry contains everything the radio base station needs to know about a neighbouring radio base station. Traditionally, for wireless communication networks having a centralised ANR functionality, NRTs have been populated using cell planning tools by means of coverage predictions before the installation of a radio base station. Prediction errors, due to imperfections in map and building data, have forced the operators to resort to drive/walk tests to completely exhaust the coverage region and identify all handover regions. This is significantly simplified in LTE, which features the UE ANR (User Equipment Automatic Neighbour Relations) function, which means that user equipments shall decode and report the CGI information of neighbour cells to the serving cell upon request.

Traditionally, the NRT is defined from the O&M system, and this possibility still exists even when ANR is implemented. However, it is possible to launch base stations without any NRT entries at all. Each NRT entry is uniquely identified by a target cell identifier. If the target cell is an LTE cell at the same frequency, this identifier is the CGI, and NRT also contains the PCI. It is the CGI that the radio base station uses when signalling to another radio base station via the MME, since the MME routes the messages based on radio base station identity which is a part of CGI. The CGI is also used when acquiring via MME the IP address of another radio base station, which is used for X2 interface establishment. Additionally, the NRT entry contains information about X2 availability, whether ANR may remove the neighbour relation or not, and whether the neighbour relation may be used for handover or not.

At large, the main ANR function objectives are to automatically add and remove entries to/from the NRT. NRT additions are driven by Radio Resource Control (RRC) signalling between the radio base station and user equipments, which provides measurement control and reporting means. RRC is used to define measurements of candidate cells, which means that the user equipments report measurement information to the serving radio base station, and upon request the mobile also decode and report the unique CGI information.

If the policy is to establish X2 for neighbour relations and if X2 is not already available, then CGI is used to recover the target radio base station IP address, which is used for X2 setup. When the X2 interface is established, the radio base stations can share information about their served cells including PCIs and CGIs. Also, optionally, the neighbour relations may be enforced to be mutual meaning that the target cell also establishes a neighbour relation to the source cell. Finally, the remaining NRT entry attributes are defined, either via O&M, or by using default values.

NRT entry removal is typically via timers, restarted every time a neighbour relation is used for handover. The entry is removed if the neighbour relation has not been used within a pre-determined time period.

The NRT also describes a logical network model of the wireless communication network in terms of needed and used inter-node relations. This logical network model can be useful beyond only user equipment mobility—also radio base station radio resource management functions for example can benefit. One example of the latter is interference coordination. A radio base station, serving a cell, which in turn serves a set of user equipments, is aware of which other cells that potentially are affected by the set of user equipments via the logical network model. Moreover, if operation of a cell is significantly impaired by interference, the radio base station can initiate interference coordination with other radio base stations based on information from the logical network model.

A cell is defined as a geographical area served by radio base station equipment at a particular frequency using a particular radio access technology. A cell can also be defined as a geographical area served by a radio base station using any frequency carrier and/or using any radio access technology. Which definition is to be used depends on the type of the wireless communication system comprising the cell.

In for example LTE, for each served cell, the radio base station maintains a neighbour relation table, comprising information related to the respective neighbouring cell. The neighbour cell may be an external cell (served by a different base station), or an internal cell (served by the same radio base station). The radio base station also may maintain performance measurements associated to the neighbour relation.

Figure 1A:
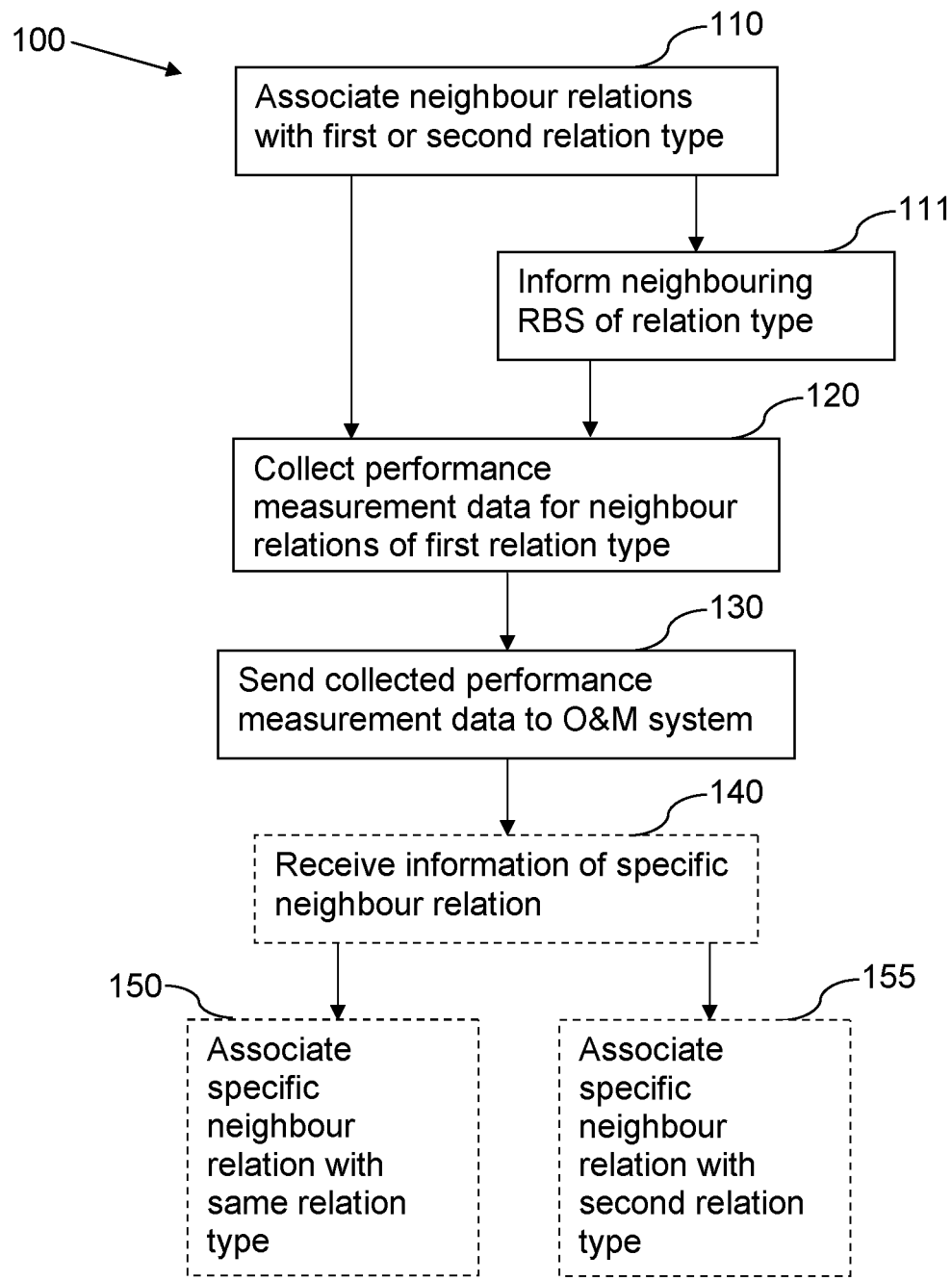
FIG. 1a is a flowchart of an exemplifying embodiment of a method in a radio base station for management of neighbour relations.

FIG. 1a is a flowchart of an exemplifying embodiment of a method in a radio base station for management of neighbour relations with respect to neighbouring radio base stations, the radio base station being connected to an O&M system requesting performance measurement data relating the neighbour relations from the radio base station. The method comprises associating 110, in the radio base station, each neighbour relation with a predefined first or a predefined second neighbour relation type, wherein the first neighbour relation type indicates that the neighbour relation is to be monitored and the second neighbour relation type indicates that the neighbour relation is to be unmonitored. The method further comprises collecting 120 performance measurement data relating to mobility for neighbour relations associated with the first neighbour relation type, and sending 130 the collected performance measurement data for neighbour relations associated with the first neighbour relation type to the O&M system.

When a neighbour relation is created or established in a radio base station, it is first associated with the predefined first or the predefined second neighbour relation type. This means that all neighbour relations in a radio base station are associated with a first or a second relation type. The first neighbour relation type, i.e. the monitored type, implies that the neighbour relation is to be "fully" monitored, meaning that performance measurement data for more or less all events on the neighbour relation is to be sent to the O&M system. The second neighbour relation type, i.e. the unmonitored type, implies that the neighbour relation is to be "partially" monitored or not monitored, meaning that no performance measurement data for any events on the neighbour relation is to be sent to the O&M system.

As a neighbour relation has been created or established and also associated with a relation type, the radio base station monitors or observes the neighbour relation. The radio base station collects performance measurement data relating to mobility for all neighbour relations which are of the first relation type. It shall be pointed out that the radio base station may optionally collect performance measurement data relating to mobility also for all neighbour relations having the same second relation type. In this manner, the radio base station obtains knowledge of the performance and events relating to the different neighbour relations which are present, i.e. created or established, in the radio base station, at least for those neighbour relations which are associated with the first neighbour relation type.

Collecting performance measurement data relating to mobility comprises receiving performance measurement data from neighbouring radio base stations, to gather and compile performance measurement data within the radio base station and/or to increment various counters pertaining to events taking place in the radio base station.

When performance measurement data relating to mobility has been collected, the radio base station sends the collected performance measurement data for neighbour relations associated with the first neighbour relation type to the O&M system. Even if the radio base station also has collected the same performance measurement data relating to mobility for neighbour relations associated with the second neighbour relation type, the radio base station refrains from sending such data to the O&M system.

This exemplifying embodiment of the method in a radio base station has several advantages. The amount of data sent from each radio base station in the wireless communication network is reduced, which reduces the storage requirements in the O&M system. It further reduces analysing resources in the O&M system as a reduced amount of data needs to be analysed. Still further, it reduces the load on the interface between the radio base station and the O&M system. This results in more efficient transfer of O&M data, i.e. the collected performance measurement data. Still an advantage is that the logical network model is more accurate since the number of neighbour relation limits per cell of radio base stations may not need to be considered due to transport and storage limits.

For monitored neighbour relations, i.e. neighbour relations associated with the first relation type, the performance measurements are sent to the O&M system, either regularly or event-driven, possibly as a combination of several events. On the contrary, for unmonitored neighbour relations, no performance measurement data is transported to the network management node.

In an embodiment, the second neighbour relation type implies that performance measurement data relating to mobility for some events for the neighbour relation are collected and sent to the O&M system. The events for which performance measurement data is to be collected, for the second unmonitored type of neighbour relations, may be referred to as reduced scope of performance measurements.

The O&M system may configure the scope of the first (monitored) and the second (unmonitored) neighbour relation types to define the content of the performance measurement reports transported to the network management node.

According to an embodiment, the performance measurement data relating to mobility for a neighbour relation comprises a counter referring to a number of handover attempts and/or a number of successful handovers of user equipments between the radio base station and a neighbouring radio base station in the neighbour relation.

Looking again at FIG. 2a and the example of a road going across the cells being served by base stations A and B causing user equipments being frequently handed over between the two radio base stations A and B. In an example, looking at radio base station A, there may be different counters for successful handovers to radio base station A and for successful handovers from radio base station A. There may further be two separate counters for unsuccessful handovers to or from radio base station A. Alternatively, there is one counter for successful handovers to and from radio base station A and one counter for unsuccessful handovers to and from radio base station A.

Figure 1B:
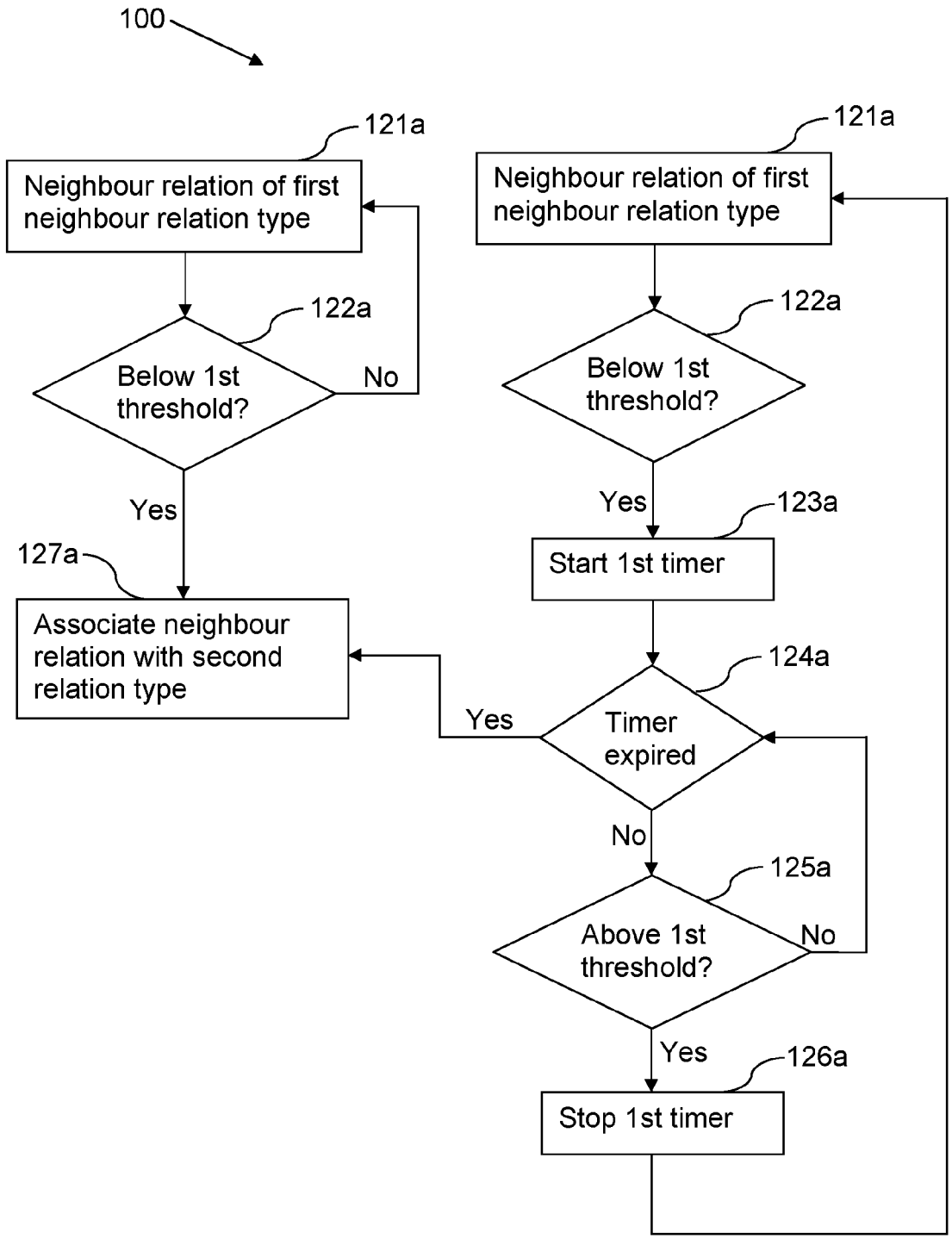
FIG. 1b is a flowchart of yet an exemplifying embodiment of a method in a radio base station for management of neighbour relations.

Looking at FIG. 1b, a flowchart of an exemplifying embodiment of the method 100 is illustrated.

According to this embodiment, if a neighbour relation is associated 121a with the first neighbour relation type and the collected performance measurement data for the neighbour relation indicates that the counter falls below a first pre-determined threshold for the neighbour relation, the method further comprises changing 127a the neighbour relation type for the neighbour relation to the second neighbour relation type.

In a wireless communication network, the user equipments move about in different cells causing the use of the resources of a cell to vary over time. Looking again at FIG. 2a and the example of a road going across the cells being served by radio base stations A and B causing user equipments being frequently handed over between the two radio base stations A and B. In an example, the radio base stations A and B are located along the road in the countryside such that there is a lot of traffic, and hence many user equipments travelling, between the two radio base station at rush hours in the weekdays, typically in the morning and afternoon during weekdays. During other hours in the weekdays and weekends, the traffic and hence the number of user equipments travelling between the two radio base stations are quite few.

As an example, the neighbour relation between radio base stations A and B is associated 121a with the first neighbour relation type in radio base station A. The performance measurement data for the neighbour relation with radio base station B is collected. The collected performance measurement data comprises at least one counter as having been described above. At some point in time, the collected performance measurement data for the neighbour relation with radio base station B indicates that the counter falls below a first pre-determined threshold. This is illustrated in FIG. 1b by box 122a. Then, the method further comprises changing 127a the neighbour relation type for the neighbour relation to the second neighbour relation type.

According to still an embodiment, the method further comprises starting 123a a first timer when the counter falls below the first pre-determined threshold for the neighbour relation, and stopping 126a the timer if the counter exceeds the first pre-determined threshold, wherein the change 127a of neighbour relation type is executed if the first timer expires.

Looking at FIG. 1b, the right hand side, a first timer is started 123a in radio base station A as soon as the counter falls below the first pre-determined threshold for the neighbour relation with radio base station B. Then if the counter, i.e. the counter comprised in the performance measurement data, exceeds the first pre-determined threshold before the timer expires, then the timer is stopped 126a and the neighbour relation type is kept to be of the first neighbour relation type. However, if the first timer does expire, the neighbour relation type is changed and associated with the second neighbour relation type.

In one example, the level of the first threshold and the duration of the first timer are determined by a configuration in the O&M system. The result of the first timer is that the counter comprised in the performance measurement data must remain below the first threshold for a certain duration in time, i.e. the length of the first timer, until the neighbour relation type is changed to the second neighbour relation type. This is to ensure that the neighbour relation types are not changed too often and that any short temporary reduction of the counter comprised in the performance measurement data leads to a change of neighbour relation type.

Figure 1C:
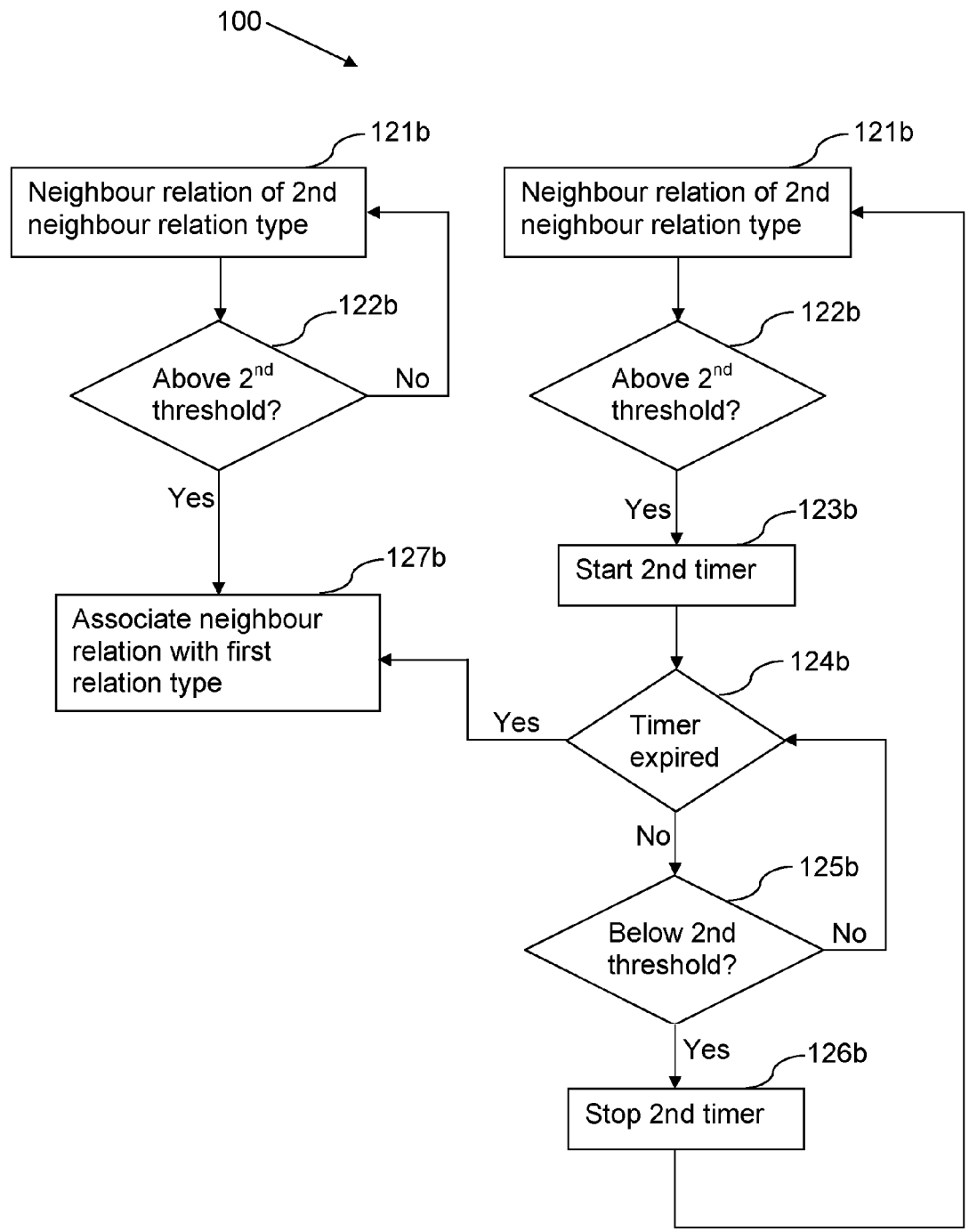
FIG. 1c is a flowchart of still an exemplifying embodiment of a method in a radio base station for management of neighbour relations

Looking at FIG. 1c, a flowchart of an exemplifying embodiment of the method 100 is illustrated.

According to an embodiment, if a neighbour relation is associated 121b with the second neighbour relation type and the collected performance measurement data for the neighbour relation indicates that the counter exceeds a second pre-determined threshold for the neighbour relation, the method further comprises changing 127b neighbour relation type for the neighbour relation to the first neighbour relation type.

As having been described above, the user equipments move about in different cells causing the use of the resources of a cell to vary over time. As an example, referring again to FIG. 2a, the neighbour relation between radio base stations A and B is associated 121b with the second neighbour relation type in radio base station A. The performance measurement data for the neighbour relation with radio base station B is collected. The collected performance measurement data comprises at least one counter as having been described above. At some point in time, the collected performance measurement data for the neighbour relation with radio base station B indicates that the counter exceeds a second pre-determined threshold. This is illustrated in FIG. 1c by box 122b. Then, the method further comprises changing 127b the neighbour relation type for the neighbour relation to the first neighbour relation type.

According to yet an embodiment, the method further comprises starting a second timer 123b when the counter exceeds the second pre-determined threshold for the neighbour relation, and stopping 126b the timer if the counter falls below the second threshold wherein the change 127b of neighbour relation type is executed if the second timer expires.

Looking at FIG. 1c, the right hand side, a second timer is started 123b in radio base station A as soon as the counter exceeds the second pre-determined threshold for the neighbour relation with radio base station B. Then if the counter, i.e. the counter comprised in the performance measurement data, falls below the second pre-determined threshold before the second timer expires, then the second timer is stopped 126b and the neighbour relation type is kept to be of the second neighbour relation type. However, if the second timer does expire, the neighbour relation type is changed and associated with the first neighbour relation type.

In one example, the level of the second threshold and the duration of the second timer are determined by a configuration in the O&M system. The result of the second timer is that the counter comprised in the performance measurement data must remain above the second threshold for a certain duration in time, i.e. the length of the second timer, until the neighbour relation type is changed to the first neighbour relation type. This is to ensure that the neighbour relation types are not changed too often and that any short temporary increase of the counter comprised in the performance measurement data leads to a change of neighbour relation type.

According to an embodiment, the method 100 further comprises signalling 111, to a neighbouring radio base station having a relation to the radio base station, the neighbour relation type.

Again, looking at FIG. 2*a*, if radio base station A either creates a neighbour relation, for example to radio base station B, and associates the neighbour relation with the first or the second relation type; or if radio base station A changes the neighbour relation type of an already existing neighbour relation, for example to radio base station B, then radio base station A informs radio base station B about the neighbour relation type that radio base station A has associated the neighbour relation with. Radio base station A informs radio base station B about the neighbour relation type by signalling to or sending a message to radio base station B indicating the neighbour relation type which radio base station A has "chosen" for the neighbour relation.

According to yet an embodiment, looking at FIG. 1*a*, the method further comprises receiving 140, from a neighbouring radio base station, information of a neighbour relation set up by the neighbouring radio base station; and associating 150, in the radio base station, the neighbour relation with the same neighbour relation type as used by the neighbouring radio base station setting up the neighbour relation.

In an example with radio base station A and B, assume that radio base station B has created a neighbour relation with radio base station A and "chosen" a neighbour relation type; or changed the neighbour relation type of the neighbour relation with radio base station A, then radio base station B informs, by signalling to, radio base station A about the neighbour relation type. When radio base station A receives 140 this information, radio base station A creates a corresponding neighbour relation in radio base station A and associates the neighbour relation with the same type as has radio base station B. In case radio base station A already has a neighbour relation to radio base station B, radio base station A associates the neighbour relation with the relation type as has been "chosen" by radio base station B. "Chosen" by radio base station B means that radio base station B has associated the neighbour relation with a first or second neighbour relation type. In this way, a neighbour relation between two radio base stations will always be of the same type in both radio base stations.

This prevents the logical network model from becoming incomplete and unbalanced. In an interference coordination scenario, a radio base station may be aware of which other cell its users are affecting, but the interfered cells may be unaware from where the interference originates. Thereby, the radio base station cannot signal and indicate high interference in order to request interference relief.

According to yet an embodiment, looking at FIG. 1*a*, the method further comprises receiving 140, from a neighbouring radio base station, information of a neighbour relation set up by the neighbouring radio base station; and associating 155, in the radio base station, the neighbour relation with the second neighbour relation type.

In an example with radio base station A and B, assume that radio base station B has created a neighbour relation with radio base station A and "chosen" a neighbour relation type; or changed the neighbour relation type of the neighbour relation with radio base station A, then radio base station B informs, by signalling to, radio base station A about the neighbour relation type. When radio base station A receives 140 this information, radio base station A creates a corresponding neighbour relation in radio base station A and associates the neighbour relation with the second neighbour relation type regardless of the type "chosen by" radio base station B. In case radio base station A already has a neighbour relation to radio base station B, radio base station A associates the neighbour relation with the second neighbour relation type.

In this way, a neighbour relation between two radio base stations, wherein the relation is of the first type in one of the radio base stations, will always be of the first type in one of the radio base stations. This reduces the amount of data being sent to the O&M system as one of the radio base stations, i.e. the one which has associated the neighbour relation with the first type (the monitored type), will send measured performance data to the O&M system.

It shall be pointed out that in the embodiments above, when a radio base station receives information from a neighbouring radio base station about a change of relation type or creation of a neighbour relation, and the radio base station creates or changes its neighbour relation type accordingly, the radio base station does not signal back to the neighbouring radio base station to inform the neighbouring radio base station about the actions taken in the radio base station. The radio base station only signals information regarding a neighbour relation and the relation type to a neighbouring radio base station in the case that the radio base station has created the neighbour relation, or if the radio base station has changed the neighbour relation type due to a detected increase or decrease in one or more counters comprised in the measured performance data.

In an example, looking at FIG. 2*a*, radio base station A has a neighbour relation with radio base station B. In this example, the method further comprises radio base station A sending the measured performance data relating to mobility, or a summary of the data e.g. in the form of a check sum or similar, to radio base station B via the X2-interface. When radio base station B receives this information from radio base station A, radio base station B is enabled to verify that radio base station A and radio base station B have corresponding measured performance data relating to mobility for the neighbour relation between them. If radio base station B discovers a discrepancy between measured performance data relating to mobility obtained by the two radio base stations, radio base station B sends its measured performance data relating to mobility for the neighbour relation to the O&M system, regardless of which neighbour relation type radio base station B has associated the neighbour relation with. It shall be pointed out that even if radio base station B has associated the neighbour relation with the second unmonitored type, radio base station B may still collect the same amount and type of measured performance data relating to mobility as if the neighbour relation type had been the first monitored type. The difference is the "restriction" in sending performance data relating to mobility when the neighbour relation type is the second unmonitored type. This will enable the O&M system to analyse the situation or to take other actions to information the operator of the communication network. In this way, it is ensured that the quality of the reported measured performance data is not reduced due to a radio base station associating a neighbour relation with the second neighbour relation type. Further, the possibility to identify problems and discrepancies through redundancy is maintained.

The above described neighbour relations types are in an example configured in the O&M system or any other network management node.

The above exemplified embodiments are not restricted to monitored and unmonitored types of neighbour relations. As an example, the two types of neighbour relations are full-scope monitored and reduced-scope monitored. The full-scope monitored corresponds to the above described monitored neighbour relation type. By reduced-scope monitored is meant that the neighbour relation is to be monitored with reduced scope. This approach means that measured performance data relating to mobility is collected and sent to the O&M system according to the two different scopes. In an example, the reduced scope monitored implies that no monitoring at all is performed, or that fewer counters are collected and sent to the O&M system as compared to the full-scope monitored. In yet an example, the reduced scope monitored of neighbour relation implies that the measured performance data relating to mobility for such a neighbour relation is reported more seldom than measured performance data relating to mobility for a neighbour relation associated with the full-scope monitored.

Further, the above exemplified embodiments are not restricted to only two neighbour relation types. In an example, three types of neighbour relations can be associated with a neighbour relation, full-scope monitored, reduced-scope monitored and unmonitored. In this example, the reduced-scope monitored implies that fewer counters are collected and sent to the O&M system as compared to the full-scope monitored. According to yet an example having more than two neighbour relation types, thresholds may be used with regards to the "activity" in the neighbour relation in order to toggle or switch between the different neighbour relation types in a similar manner as has been described above for the two neighbour relation types.

Embodiments herein also relate to a radio base station 200 adapted to manage neighbour relations with respect to neighbouring radio base stations. The radio base station has the same objects and advantages as the method in a radio base station which has been described above. The radio base station will only be described in brief in order to avoid unnecessary repetition. Exemplifying embodiments of such a base station will now be briefly described with reference to FIG. 2b.

Figure 2B:
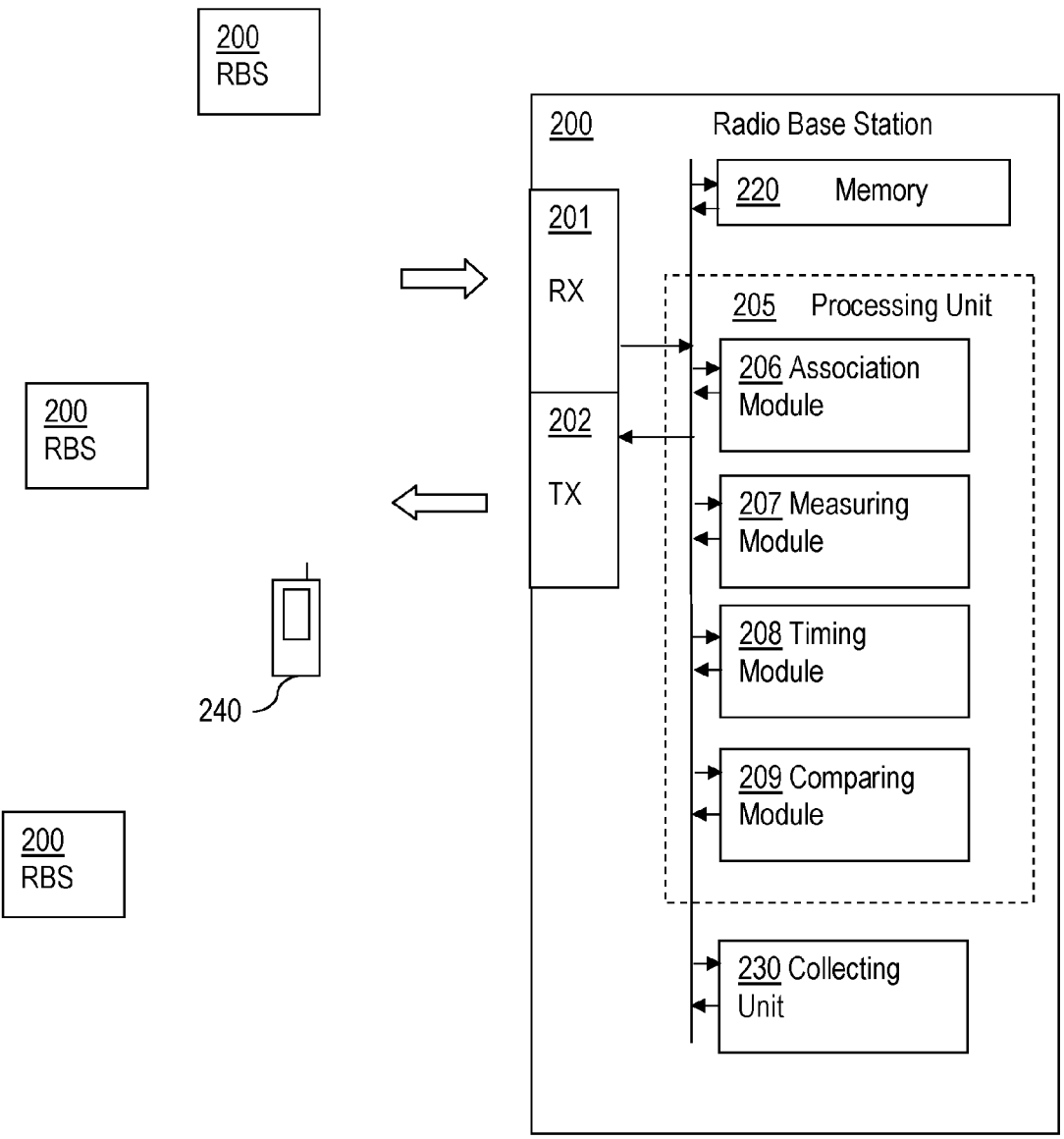
FIG. 2b is a block diagram illustrating an exemplifying embodiment of a radio base station adapted to manage neighbour relations.

FIG. 2b is a block diagram illustrating an exemplifying embodiment of a radio base radio base station adapted to manage neighbour relations. FIG. 2b illustrates a radio base station 200 comprising a receiving unit 201 and a transmitting unit 202. The receiving and transmitting units 201 and 202 enable the radio base station 200 to communicate with other radio base stations 200 and user equipments 240. The receiving and transmitting units 201 and 202 also enable the radio base station 200 to communicate with an O&M system (not shown). The receiving and transmitting units 201 and 202 may comprise a plurality of different receiving arrangements and transmitting arrangements respectively in order for the radio base station 200 to be able to communicate with other base stations, user equipments and the O/M system. FIG. 2b further illustrates the radio base station 200 comprising a memory 220, which may be a set of different memory units, and a processing module 205. It shall be pointed out that the illustrated radio base station 200 may comprise other units and arrangements in addition to the ones shown in FIG. 2b.

According to an exemplifying embodiment of a radio base station 200 adapted to manage neighbour relations with respect to neighbouring radio base stations, the radio base station is connected to an Operation and Maintenance, O&M system requesting performance measurement data relating to the neighbour relations from the radio base station. The radio base station 200 comprises a processing unit 205 configured to associate each neighbour relation with a predefined first or a predefined second neighbour relation type, wherein the first neighbour relation type indicates that the neighbour relation is to be monitored and the second neighbour relation type indicates that the neighbour relation is to be unmonitored. The radio base station 200 further comprises a collecting unit 230 configured to collect performance measurement data relating to mobility for neighbour relations associated with the first neighbour relation type. Further, the radio base station 200 further comprises a transmitting unit 202 configured to send the collected performance measurement data for neighbour relations associated with the first neighbour relation type to the O&M system.

In the exemplifying illustration of the radio base station 200 in FIG. 2b, the processing module 205 comprise an association module 206 which is configured to perform the association of each neighbour relation with a predefined first or a predefined second neighbour relation type. Further, the radio base station 200 comprises a collecting unit 230 which is configured to perform the collecting of performance measurement data. Collecting performance measurement data relating to mobility comprises receiving performance measurement data from neighbouring radio base stations, to gather and compile performance measurement data within the radio base station and/or to increment various counters pertaining to events taking place in the radio base station.

According to an embodiment, the performance measurement data relating to mobility for a neighbour relation comprises a counter referring to a number of handover attempts and/or a number of successful handovers of user equipments between the radio base station and a neighbouring radio base station in the neighbour relation.

According to still an embodiment, if a neighbour relation is associated with the first neighbour relation type and the collected performance measurement data for the neighbour relation indicates that the counter falls below a first pre-determined threshold for the neighbour relation, the processing unit 205 is further configured to change the neighbour relation type for the neighbour relation to the second neighbour relation type.

According to yet an embodiment, the processing unit 205 further is configured to start a first timer when the counter falls below the first pre-determined threshold for the neighbour relation, and to stop the timer if the counter exceeds the first pre-determined threshold, wherein the processing unit further is adapted to change the neighbour relation type if the first timer expires.

Starting the first timer is performed, in one example, by the timing module 208. Detecting that the counter falls below the first pre-determined threshold for the neighbour relation is in one example performed by the comparing module 209, which is configured to compare the counter to the first pre-determined threshold.

According to an embodiment, if a neighbour relation is associated with the second neighbour relation type and the collected performance measurement data for the neighbour relation indicates that the counter exceeds a second pre-determined threshold for the neighbour relation, the processing unit 205 is further configured to change the neighbour relation type for the neighbour relation to the first neighbour relation type.

Still, according to an embodiment, the processing unit further 205 is configured to start a second timer when the counter exceeds the second pre-determined threshold for the neighbour relation, and to stop the second timer if the counter falls below the second threshold wherein the processing unit further is adapted to change the neighbour relation type if the second timer expires.

Starting the first timer is performed, in one example, by the timing module 208. Detecting that the counter falls below the second pre-determined threshold for the neighbour relation is in one example performed by the comparing module 209, which is configured to compare the counter to the second pre-determined threshold.

According to yet an embodiment, the transmitting unit 202 further is configured to signal, to a neighbouring radio base station having a relation to the radio base station, the neighbour relation type.

In an embodiment, the radio base station 200 further comprises a receiving unit 201 which is configured to receive, from a neighbouring radio base station, information of a neighbour relation set up by the neighbouring radio base station, and the processing unit 205 is configured to associate, the neighbour relation with the same neighbour relation type as used by the neighbouring radio base station setting up the neighbour relation.

According to yet an embodiment, the receiving unit 201 is further configured to receive, from a neighbouring radio base station, information of a neighbour relation set up by the neighbouring radio base station, and the processing unit 205 is further configured to associate the neighbour relation with the second neighbour relation type.

Figure 3A:
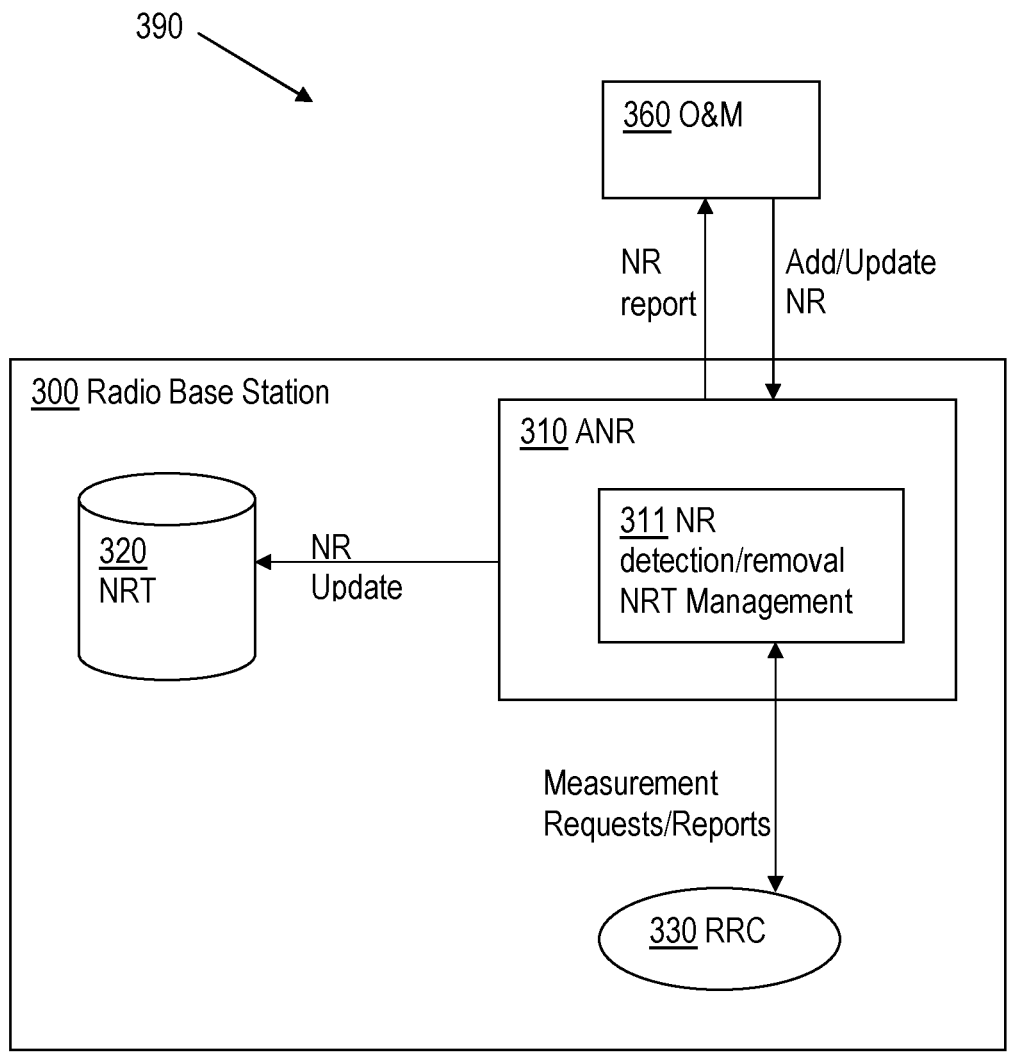
FIG. 3a is a block diagram illustrating an exemplifying radio base radio having neighbour relation functionality.

FIG. 3a is a block diagram illustrating an exemplifying radio base radio base station having neighbour relation functionality. FIG. 3a is also a schematic illustration of a wireless communication system comprising the radio base station and an O&M system.

As was discussed above, for LTE, the radio base station maintains a neighbour relation table (NRT) for each cell. The entries in the NRT are in LTE created by means of the UE ANR (User Equipment Automatic Neighbour Relations) function.

FIG. 3a illustrates a radio base station 300 comprising the ANR function 310. The ANR function 310 comprises neighbour detection functions which finds new neighbours and adds them to the NRT. The ANR 310 further comprises removal functions for removing outdated neighbour relations. The O&M system 360 receives measured performance data from the radio base station 300 and the O&M also provides configurations of different parameters to the radio base station 300.

Figure 3B:
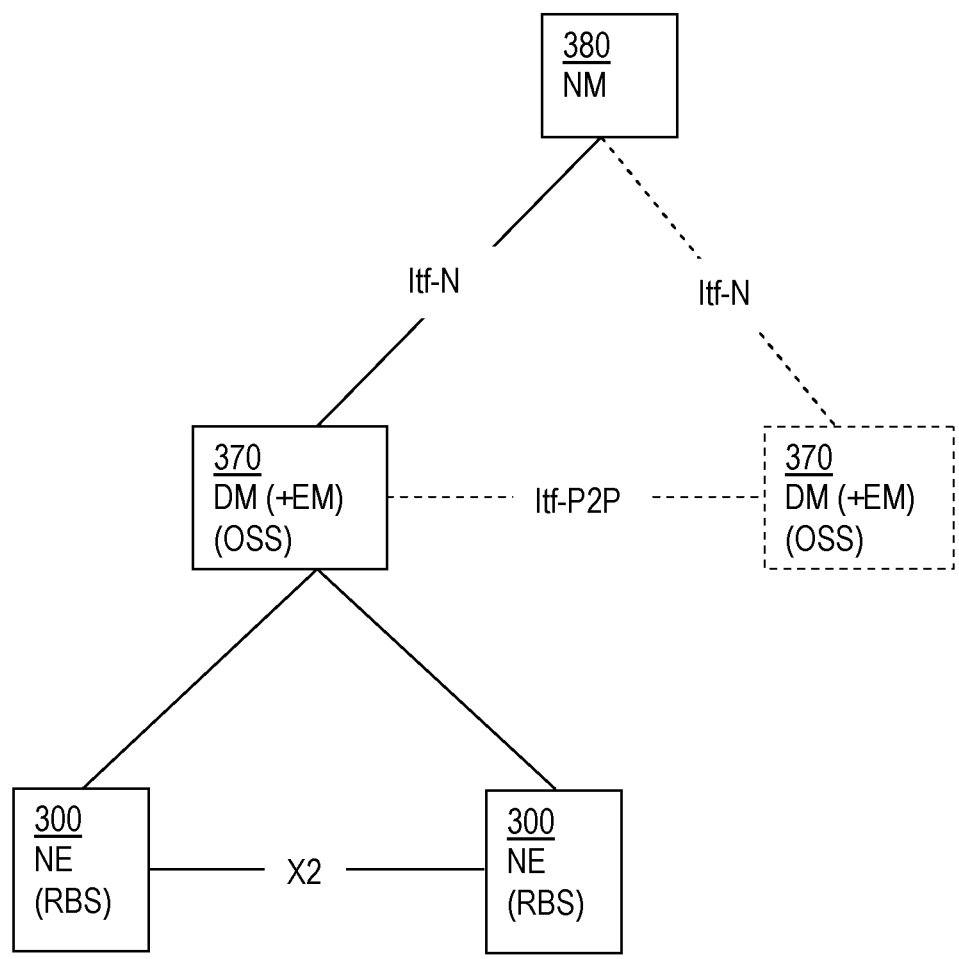
FIG. 3b is a block diagram illustrating an exemplifying network management system.

FIG. 3b is a block diagram illustrating an exemplifying network management system.

The network elements (NE) 300, also referred to as radio base stations (RBS), are managed by a domain manager (DM) 370, also referred to as the operation and support system (OSS). The OSS comprises the O&M system. Sometimes the individual elements (RBS) are handled by an element manager (EM), which is a part of the DM. The tasks of the DM include configurations of the network elements, fault management and performance monitoring. The latter can mean that extensive data from events and counters is regularly transferred from the network elements up to the DM as having been described above A DM may further be managed by a network manager (NM) via an interface or protocol called Itf-N. Two NEs are interfaced by X2, whereas the interface between two DMs is referred to as Itf-P2P. This means that multi-vendor management can be handled either via the common NM and the interface Itf-N, or via the peer-to-peer interface Itf-P2P. Furthermore, the X2 interface between radio base stations also supports some management.

As having been described above, measured performance data relating to mobility may comprise a plurality of different counters. In addition to the examples given above, in one example there is one counter for S1 handovers and one for X2-handovers. An S1 handover is a handover controlled by the MME and an X2 handover is a handover between two radio base stations wherein the handover is controlled by the two radio base stations involved. Further examples of counters are handovers performed for radio reasons, for time critical handovers and resource optimisation handovers. A combination of events into a procedure of events is also considered in yet an example. An example of a combination of events is S1 handover event which comprises handover preparation and execution events. It is evident that the measured performance data easily adds up to many performance instances or counters per neighbour relation.

By the exemplifying embodiments described above for the radio base station and the method therein, the transport of data and storage of data on the DM level and on the NM level are simplified by reducing the amount of data which is to be sent to the DM level and subsequently to the NM level.

In the example of the reduced scope of performance measurements, the reduced scope of performance measurements implies that fewer performance measurement data (counters) are collected or monitored. In another example, the reduced scope of performance measurements implies that the performance measurement data are sent to the O&M more seldom compared to reports from neighbour relations being associated with the first neighbour relation type. For example, collected performance measurement data for neighbour relations of the first type are sent every 15 minutes, while collected performance measurement data for neighbour relations of the second type are sent every 24 hours. In still an example, the collected performance measurement data for neighbour relations of the second type are sent upon specific request from the O&M system.

A neighbour relation may be created or established in the radio base station by the ANR functionality or via an O&M interface, wherein the O&M system communicates a neighbour relation to the radio base station. Then the neighbour relation is associated, in the radio base station, with the predefined first or the predefined second neighbour relation type. The "choice" of type is in one example preconfigured in the O&M system. For example, the configuration in the O&M system causes the radio base station to always associate a newly created or established neighbour relation with the first neighbour relation type. In another example, the configuration in the O&M system causes the radio base station to always associate a newly created or established neighbour relation with the second neighbour relation type. In still another example, the configuration in the O&M system causes the radio base station to associate a newly created or established neighbour relation to the first or second neighbour relation type depending on the cell type or radio base station type of the neighbouring radio base station or cell. As an example, if the neighbouring radio base station is a macro radio base station, the newly created or established neighbour relation to the macro radio base station is always associated with the first neighbour relation type; and if the neighbouring radio base station is a low power radio base station, the newly created or established neighbour relation to the low power radio base station is always associated with the second neighbour relation type. Examples of low power radio base stations are pico, femto and home radio base stations as well as relay nodes.

According to an embodiment, the neighbour relation type is changed depending on time of day, week or year.

Although the exemplifying embodiments have been described in relation to an LTE communication system having a de-centralised ANR functionality, the exemplifying embodiments may be realised in a wireless communication system having a centralised ANR functionality.

Figure 4:
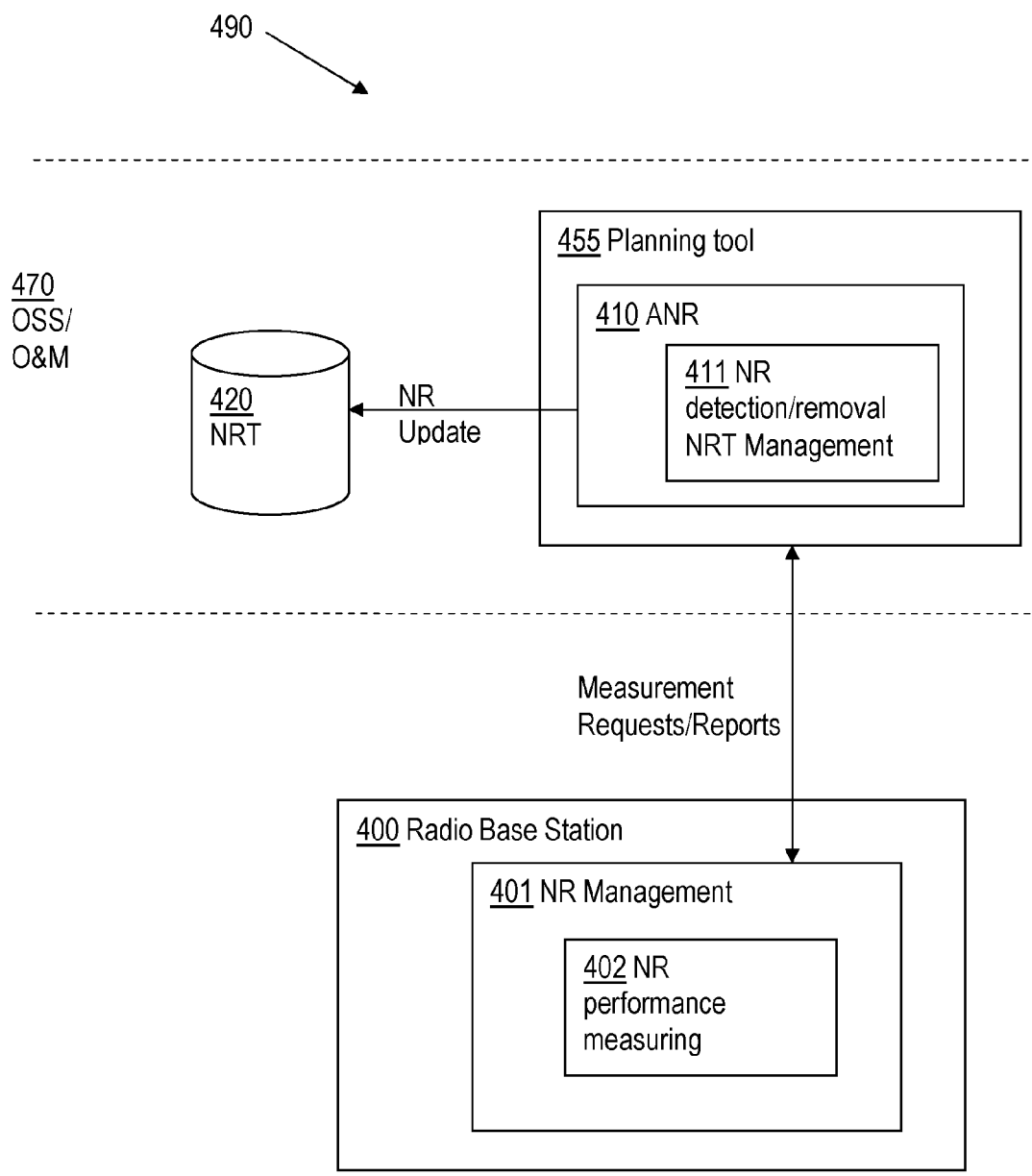
FIG. 4 is a block diagram of an exemplifying network management system having a centralised Automatic Neighbour Relation functionality.

FIG. 4 is a block diagram of an exemplifying network management system having a centralised ANR functionality. FIG. 4 is also a schematic illustration of a wireless communication system comprising the radio base station and an O&M system. In a wireless communication network 490 having a centralised ANR functionality, the ANR functionality 410 is typically implemented in a management node in the OSS 470. The management node comprises a planning tool 455 which comprises the ANR functionality. The difference from a de-centralised approach is that the user equipments cannot detect and report neighbour relations. Instead, the neighbour relations are defined and kept in the ANR functionality 410 in the OSS 470. The neighbour relations are provided to the radio base stations as well as an indication of which neighbour relation type the radio base station is to associate the neighbour relation with. Thereafter the radio base station collects performance measurement data relating to mobility for neighbour relations associated with the first neighbour relation type and sends the collected performance measurement data for neighbour relations associated with the first neighbour relation type to the O&M system, i.e. OSS 470. This illustrates that the exemplified embodiments can be implemented in a communication network having a centralised ANR functionality. Examples of such communication networks are Global System for Mobile communication (GSM), General Radio Packet Services (GPRS) and Third generation mobile communication (3G).

Embodiments herein also relate to a wireless communication system 390, 490 adapted to manage neighbour relations between neighbouring radio base stations comprised in the wireless communication system. The system has the same objects and advantages as the above described method in a radio base station and the radio base station. The wireless communication system will therefore only be described in brief in order to avoid unnecessary repetition.

The wireless communication system 390, 490 comprises an Operation and Maintenance, O&M, system 360, 470 adapted to request and maintain performance measurement data relating to mobility for neighbour relations. The wireless communication system further comprises radio base stations 200, 300, 400. Each of the radio base stations 200, 300, 400 is configured to: associate each neighbour relation between the radio base station and a neighbouring radio base station with a predefined first or a predefined second neighbour relation type, wherein the first neighbour relation type indicates that the neighbour relation is to be monitored and the second neighbour relation type indicates that the neighbour relation is to be unmonitored. Each of the radio base station is further configured to collect performance measurement data relating to mobility for neighbour relations associated with the first neighbour relation type and to send the collected performance measurement data for neighbour relations associated with the first neighbour relation type to the O&M system It should be noted that FIG. 2b merely illustrates various functional units and modules in the radio base station in a logical sense. The functions in practice may be implemented using any suitable software and hardware means/circuits etc. Thus, the embodiments are generally not limited to the shown structures of the radio base station and the functional units and modules. Hence, the previously described exemplary embodiments may be realised in many ways. For example, one embodiment includes a computer-readable medium having instructions stored thereon that are executable by the processing unit for performing the method steps. The instructions executable by the computing system and stored on the computer-readable medium perform the method steps of the present invention as set forth in the claims.

While the embodiments have been described in terms of several embodiments, it is contemplated that alternatives, modifications, permutations and equivalents thereof will become apparent upon reading of the specifications and study of the drawings. It is therefore intended that the following appended claims include such alternatives, modifications, permutations and equivalents as fall within the scope of the embodiments and defined by the pending claims.

The invention claimed is:

1. A method in a radio base station for management of neighbour relations with respect to neighbouring radio base stations, the radio base station being connected to an Operation and Maintenance (O&M), system requesting performance measurement data relating said neighbour relations from the radio base station, the method comprising:

associating, in the radio base station, each neighbour relation with a predefined first or a predefined second neighbour relation type, wherein each neighbour relation comprises a relationship between a cell served by the radio base station and a neighbour cell, and the first neighbour relation type indicates that performance measurement data relating to mobility for each neighbour relation is to be monitored by the radio base station and the second neighbour relation type indicates that performance measurement data relating to mobility for each neighbour relation is to be unmonitored by the radio base station, collecting performance measurement data relating to mobility for each neighbour relation associated with the first neighbour relation type, wherein said collecting performance measurement data relating to mobility for each neighbour relations associated with the first neighbour relation type comprises a counter referring to a number of handover attempts and/or a number of successful handovers of a user equipment between the radio base station and a neighbouring radio base station in each neighbour relation, and sending said collected performance measurement data for each neighbour relations associated with said first neighbour relation type to the O&M system, wherein if a neighbour relation is associated with the first neighbour relation type and the collected performance measurement data for said neighbour relation indicates that the counter falls below a first pre-determined threshold for said neighbour relation, the method further comprises changing the first neighbour relation type for said neighbour relation to the second neighbour relation type.

2. The method according to claim 1, further comprising starting a first timer when the counter falls below the first pre-determined threshold for said neighbour relation, and stopping the timer if the counter exceeds the first pre-determined threshold, wherein changing of neighbour relation type is executed if the first timer expires.

3. The method according to claim 1, further comprising:
collecting performance measurement data relating to mobility for neighbour relations associated with the second neighbour relation type; wherein if a neighbour relation is associated with the second neighbour relation type and the collected performance measurement data for said neighbour relation indicates that the counter exceeds a second pre-determined threshold for the neighbour relation, the method further comprises changing neighbour relation type for the neighbour relation to the first neighbour relation type.

4. The method according to claim 3, further comprising starting a second timer when the counter exceeds the second pre-determined threshold for said neighbour relation, and stopping the timer if the counter falls below the second threshold wherein changing of neighbour relation type is executed if the second timer expires.

5. The method according to claim 1, further comprising signalling, to a neighbouring radio base station having a relation to the radio base station, the neighbour relation type.

6. The method according to claim 1, further comprising:
receiving, from a neighbouring radio base station, information of a neighbour relation set up by the neighbouring radio base station, and
associating, in the radio base station, the neighbour relation with the same neighbour relation type as used by the neighbouring radio base station setting up the neighbour relation.

7. The method according to claim 1, further comprising:
receiving, from a neighbouring radio base station, information of a neighbour relation set up by the neighbouring radio base station, and
associating, in the radio base station, the neighbour relation with the second neighbour relation type.

8. A radio base station adapted to manage neighbour relations with respect to neighbouring radio base stations, the radio base station being connected to an Operation and Maintenance (O&M) system requesting performance measurement data relating to said neighbour relations from the radio base station, the radio base station comprising one or more processors, the one or more processors configured to:
associate each neighbour relation with a predefined first or a predefined second neighbour relation type, wherein each neighbour relation comprises a relationship between a cell served by the radio base station and a neighbour cell, and the first neighbour relation type indicates that performance measurement data relating to mobility for each neighbour relation is to be monitored by the radio base station and the second neighbour relation type indicates that performance measurement data relating to mobility for each neighbour relation is to be unmonitored by the radio base station,
collect performance measurement data relating to mobility for each neighbour relation associated with the first neighbour relation type, wherein said performance measurement data relating to mobility for each neighbour relation comprises a counter referring to a number of handover attempts and/or a number of successful handovers of a user equipment between the radio base station and a neighbouring radio base station in each neighbour relation, and send said collected performance measurement data for each neighbour relations associated with the first neighbour relation type to the O&M system, wherein if a neighbour relation is associated with the second neighbour relation type and the collected performance measurement data for said neighbour relation indicates that the counter exceeds a first pre-determined threshold for said neighbour relation, to change the second neighbour relation type for said neighbour relation to the first neighbour relation type.

9. The radio base station according to claim 8, wherein if a neighbour relation is associated with the first neighbour relation type and the collected performance measurement data for said neighbour relation indicates that the counter falls below a second pre-determined threshold for said neighbour relation, the one or more processors are further configured to change the neighbour relation type for said neighbour relation to the second neighbour relation type.

10. The radio base station according to claim 9, wherein the one or more processors are further configured:
to start a first timer when the counter falls below the second pre-determined threshold for said neighbour relation,
to stop the timer if the counter exceeds the second pre-determined threshold, and
to change the neighbour relation type if the first timer expires.

11. The radio base station according to claim 8, wherein the one or more processors are further configured to:
start a second timer when the counter exceeds the first pre-determined threshold for said neighbour relation,
stop the second timer if the counter falls below the first threshold, and
change the neighbour relation type if the second timer expires.

12. The radio base station according to claim 8, wherein the one or more processors are further configured to signal, to a neighbouring radio base station having a relation to the radio base station, the neighbour relation type.

13. The radio base station according to claim 8, wherein the one or more processors are further configured to:
receive, from a neighbouring radio base station, information of a neighbour relation set up by the neighbouring radio base station, and
to associate the neighbour relation with the same neighbour relation type as used by the neighbouring radio base station setting up the neighbour relation.

14. The radio base station according to claim 8, wherein the one or more processors are further configured to:
receive, from a neighbouring radio base station, information of a neighbour relation set up by the neighbouring radio base station, and
associate the neighbour relation with the second neighbour relation type.

* * * * *